No. 612,163. Patented Oct. 11, 1898.
F. W. HEDGELAND.
WIND MOTOR FOR SELF PLAYING INSTRUMENTS.
(Application filed Dec. 2, 1897.)
(No Model.) 3 Sheets—Sheet 1.
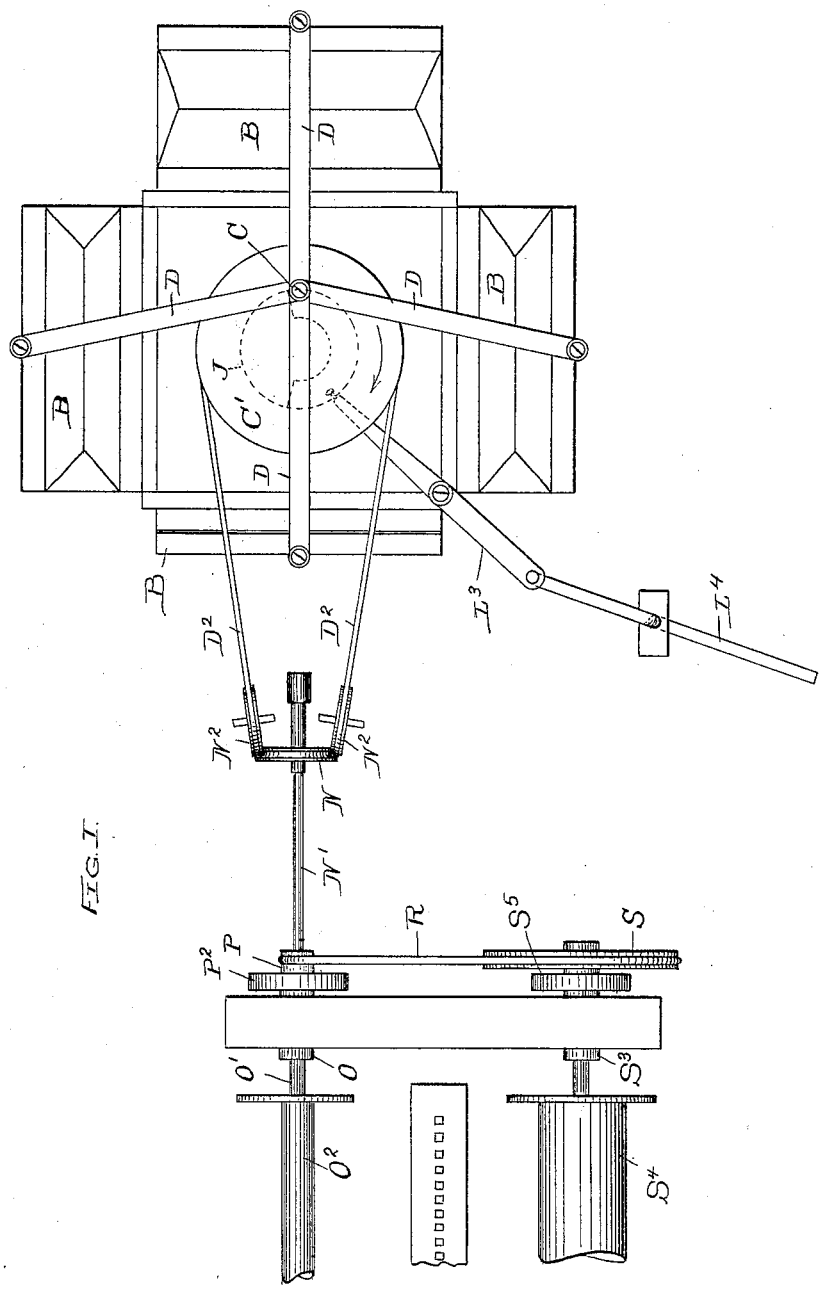
FIG. I.
WITNESSES:
INVENTOR:
FREDERICK W. HEDGELAND
HIS ATTORNEYS.

No. 612,163. Patented Oct. 11, 1898.
F. W. HEDGELAND.
WIND MOTOR FOR SELF PLAYING INSTRUMENTS.
(Application filed Dec. 2, 1897.)
(No Model.) 3 Sheets—Sheet 2.
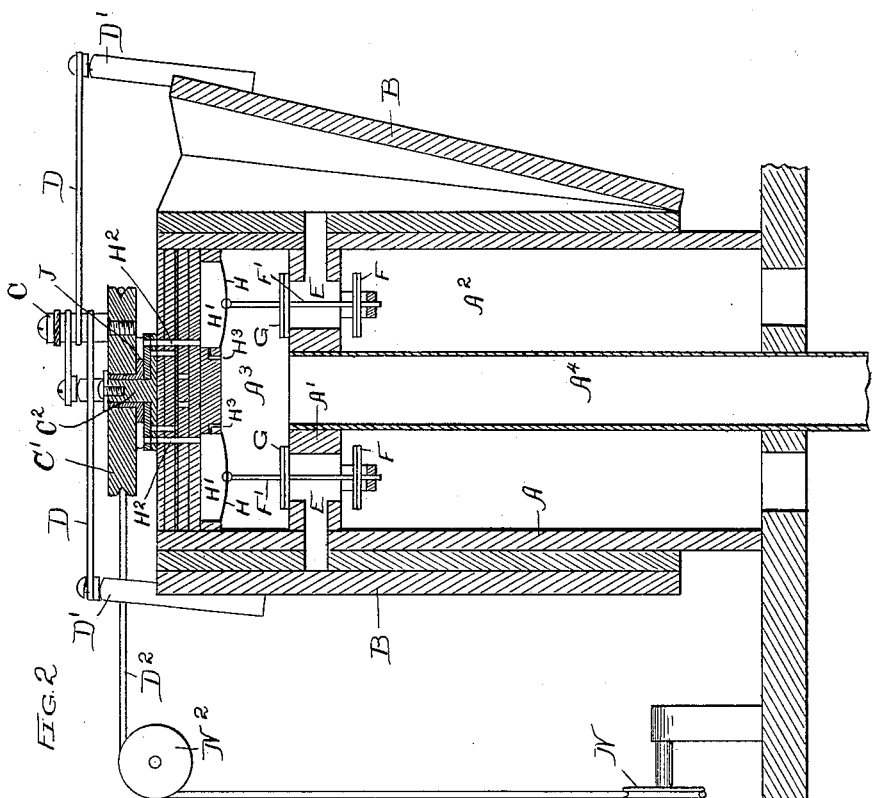
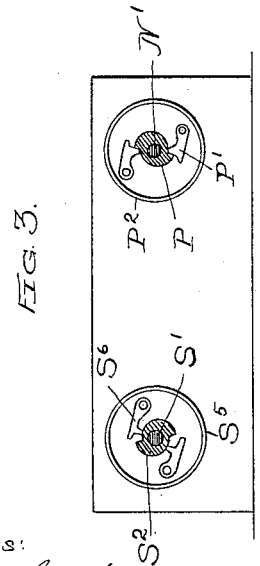
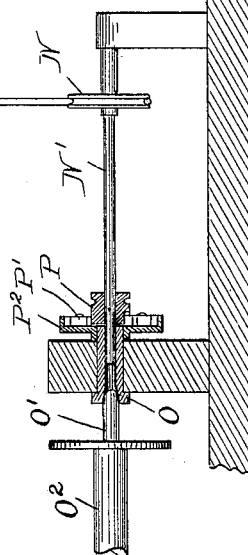
WITNESSES:
INVENTOR:
FREDERICK W. HEDGELAND
BY Munday, Evarts & Adcock
HIS ATTORNEYS No. 612,163. Patented Oct. 11, 1898.
F. W. HEDGELAND.
WIND MOTOR FOR SELF PLAYING INSTRUMENTS.
(Application filed Dec. 2, 1897.)
(No Model.) 3 Sheets—Sheet 3.
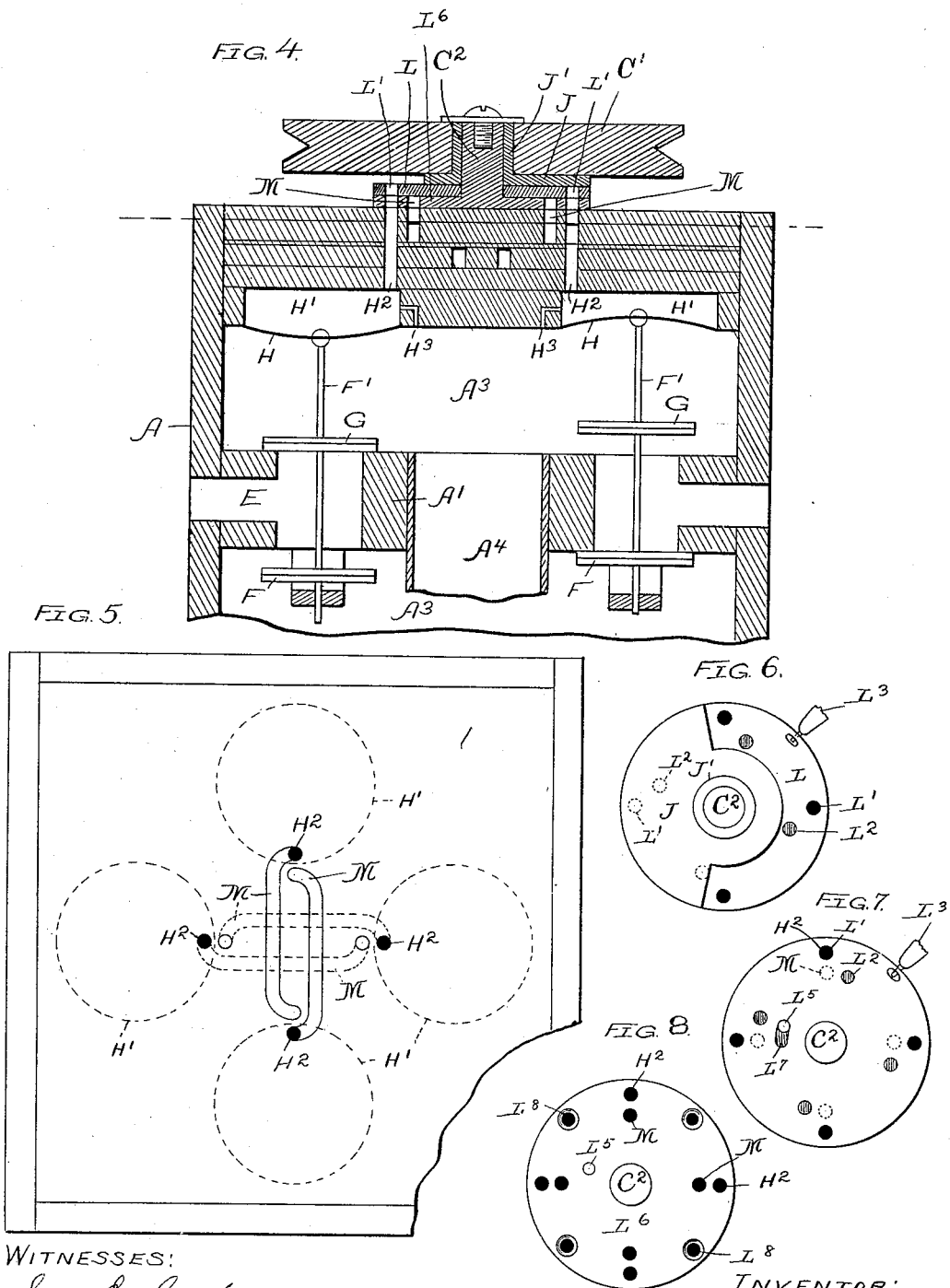
WITNESSES:
INVENTOR:
FREDERICK W. HEDGELAND
HIS ATTORNEYS.

UNITED STATES PATENT OFFICE.

FREDERICK W. HEDGELAND, OF CHICAGO, ILLINOIS, ASSIGNOR TO THE W. W. KIMBALL COMPANY, OF SAME PLACE.

WIND-MOTOR FOR SELF-PLAYING INSTRUMENTS.

SPECIFICATION forming part of Letters Patent No. 612,163, dated October 11, 1898.

Application filed December 2, 1897. Serial No. 660,489. (No model.)

*To all whom it may concern:*

Be it known that I, FREDERICK W. HEDGELAND, a citizen of the United States, residing in Chicago, in the county of Cook and State of Illinois, have invented a new and useful Improvement in Wind-Motors for Self-Playing Instruments, of which the following is a specification.

In this invention, which relates to the construction of wind-motors for operating the music-sheets of self-playing instruments, I have adapted such motors to the actuation of the music-rollers in the rewinding of the sheets by making the motors capable of reversing their motion, or, in other words, the motors themselves may be actuated in either direction, according to the service required of them—in one direction for playing and in the opposite direction for rewinding the music-sheets.

In the preferred construction of the motor the several bellows or power-pneumatics are controlled by sliding or operating valves, which are themselves controlled by membrane motors in the manner set forth in my application for patent Serial No. 658,991. I now provide the motor of my said application with a movable valve-plate, which I hereinafter designate as the "reversing-valve," in addition to the rotating valve controlling said membrane motors shown in said application. This movable valve-plate is normally stationary while the motor is running, but is movable from one of its positions to the other by the user whenever occasion requires, and in one position it causes the motor to actuate the pulley or shaft to which it directly communicates its power in one direction, and in its other position the valve-plate causes the motor to actuate the pulley or shaft in the other direction. This valve-plate directs the currents of air whereby the membrane motors are operated to the membrane motors at one side or the other of the axis of the driven device, according to the direction in which it is desired to move the music-sheet, and in order that this may be done two series of ducts leading to the membranes are provided, one series causing movement in one direction and the other series in the reverse direction, and the valve in each of its two positions is adapted to close one series of these ducts and at the same time to open the other series. By means of suitable clutches, which are preferably automatic in their operation, the take-up roll is engaged and driven in the proper direction during the playing and the music-roll is engaged and driven in the proper direction during the rewinding. All these features of my improvement will be fully understood from the description given below, and also from the accompanying drawings, in which—

Figure 1 is a plan of the motor and its mechanical connections to the music-sheet. Fig. 2 is a vertical section. Fig. 3 is a detail section showing the automatic clutching devices. Fig. 4 is a partial enlarged vertical section of the motor box or trunk. Fig. 5 is a plan view of the motor box or trunk with the top veneer or board of the head omitted. Figs. 6, 7, and 8 are plan views of the operating-valve, the reversing-valve, and the bearing or seat plate of the latter.

In said drawings, A represents a box, chest, or trunk forming the body of the motor and divided into two chambers $A^2$ and $A^3$ by the partition A'. The former of these is constantly open to the outside air at one end, and the latter is constantly exhausted of air by the bellows or other wind-producing device of the organ, being connected therewith by one or more ducts $A^4$. The trunk is many-sided, and the power-pneumatics B are placed one at each side. The number of sides, as well as the number of pneumatics, may be varied. The movable sides of the several pneumatics are each connected to a crank-pin C upon the pulley C' by means of the links D and arms D', so that by successively inflating and deflating the pneumatics they will actuate said pulley, and thereby create power in the latter, which may be transferred to the shaft to be driven by any suitable means—such, for instance, as the belt $D^2$. The pulley is supported upon the stud $C^2$.

The pneumatics are supplied with the air necessary for inflation from the chamber $A^2$ by means of the passages E, of which there is one leading from each pneumatic, and each of such passages also connects with chamber A³, so that the deflation may take place into that chamber. These movements of the air are controlled by pairs of sliding valves F and G, mounted upon stems F' and located one in the chamber A² and the other in the chamber A³ and at the ports connecting those chambers with said passages E.

Each pair of the valves F and G is connected, by means of the stem of the valves, with the membrane motor H, located in the wall of the chamber A³ and having an air-chamber H' in its rear communicating both with the outer air by duct H² and with the chamber A³ by air-passage H³, the latter being constantly open, but having only a limited capacity as compared with passages H². The passages H² are opened and closed at each rotation of the pulley by a valve-plate J, attached to the side face of the pulley and cut away at one side so that it uncovers the passages one after another in successive order and closes them almost immediately in the same successive order. When the passages are uncovered, the outer air rushes in and inflates the membranes and operates the valves F and G in one direction, and when they are closed the exhaust, acting through the small passages H³, renders the membranes neutral, thereby allowing the exhaust to shift the valves in the other direction. The valve-plate is cut away for three-fifths of its circumference or thereabout, as seen at Fig. 6. For the purpose of securing the valve-plate to the pulley it may be provided with a hub J', as shown at Fig. 4.

As thus far described, the motor is substantially identical in its construction and operation with the motor of my said previous application, and to render it reversible I have provided it with the additional features now to be described. Upon the stud C² and in bearing contact with the valve J, already described, is the reversing-valve plate L, having a series of openings L', corresponding in number to the number of membrane motors and which are so positioned as to allow all of them to be brought into register with the openings H², already described, and this will be the position of the valve-plate when the instrument is playing. The valve-plate is also provided with another series of openings L², also corresponding in number to the number of the membranes, and which are so located as to permit their being brought into register with the ports of another series of ducts or passages M, located in the top of the box, and each extending past the axis of the pulley and opening into that one of the chambers H' which is located diametrically opposite to its inlet. The valve-plate L is shifted from the position in which it registers with the ducts H² whenever the music-sheet is to be rewound, and this shifting is accomplished by means of any suitable mechanism—such, for instance, as the lever L³, let into a notch in the edge of the plate and operated by the stop-rod L⁴—and in order that the valve-plate may not be moved beyond its proper position in either direction a stop-pin L⁵, attached to the stationary plate L⁶, to which the stud of the pulley is attached, projects into a slot L⁷, formed in the valve-plate L. The stationary plate L⁶ is attached to the box by screws at the openings L⁸ and is provided with openings registering with the mouths of all the ducts H² and M, and it forms a seat for the valve L. It will be noticed that the valve L in one position opens one series of the ducts, either H² or M, and in the other position it opens the other series, and also that when it opens one series it closes the other. Each of the ducts M draws its air from the same side of the machine as one of the ducts H², the inlets of the two being in close proximity; but instead of delivering the air to the same membrane motor as its adjacent duct H² each duct M carries the same to the membrane motor at the opposite side of the machine and operates that motor instead of the one nearest to its inlet. This causes, as will be readily seen, the reversal in direction of the driven pulley and actuates the latter in the direction for rewinding, and this result is accomplished by simply shifting the valve L to the position in which the ducts M are opened. The valve L is under the control of the operator at all times, and its operation in no wise affects the movements of the operating-valve J. The power is taken from the pulley by the belt D² and transmitted to a pulley N upon a shaft N', and, where necessary, the belt is carried over an idler N². The shaft N' is adapted to be clutched to a rotatable sleeve O, engaging the journal O' of either the music-roll or the take-up roll. I have shown the music-roll O² as being supported from the sleeve. The clutching connection consists of a double-faced cam P, fastened upon the shaft N', and the gravitating catches P', pivoted upon a disk P², attached to the sleeve O. The cams are fashioned as plainly seen at Fig. 3 and are adapted to engage the catches when revolved in one direction; but when revolved in the other direction they simply lift the catches without engaging them. This form of clutch insures the rotating of the roll with the shaft N' whenever said shaft is rotated in the proper direction to cause the engagement of the catches with the cam, and the engagement and disengagement of these parts are wholly automatic. A belt R carries motion from the shaft N' to a pulley S upon a shaft S', carrying a cam S², similar to cam P, except that it is adapted to act in the opposite direction. A sleeve S³, acting to engage the other roll S⁴, operating the music-sheet, and which I have shown as being the take-up roll, is provided with a disk S⁵, carrying catches S⁶, similar to catches P', but reversed. The clutch operating the take-up roll is active when the instrument is playing and inoperative during the rewinding, while the clutch operating the music-roll is inoperative during the playing and active during the rewinding. The differences between the clutches will be fully understood from Fig. 3.

The operation of the motor will be fully understood from the above description. It is capable of being used with blow-pressure, as well as with exhaust-pressure, by connecting chamber $A^3$ with blow-pressure apparatus instead of exhaust-pressure apparatus. The passages $H^2$ and $H^3$ then become, respectively, deflators and inflators, instead of acting as inflators and deflators.

I claim—

1. The wind-motor wherein are combined power-pneumatics, operating-valves regulating the inflation and deflation of the pneumatics, membranes controlling said operating-valves, a rotary valve regulating said membranes, an air-duct for each membrane operating it during the playing of the instrument, another air-duct for each membrane operating it in the rewinding, and a reversing-valve acting alternately to open and to close the playing-ducts and the rewinding-ducts, substantially as specified.

2. The combination with the music-sheet of a self-playing instrument, of a reversible wind-motor for operating said sheet, said motor being connected to both rolls of the sheet by oppositely-acting automatic clutches, the action of which is determined by the direction in which the motor moves, substantially as specified.

3. The combination of the reversible motor, the two shafts actuated thereby, and clutches connecting said shafts to the music-sheet rolls, one of said clutches being active only when the motor is moving in one direction, and the other clutch being active only when the motor is moving in the other direction and both clutches being controlled by the direction in which the shafts are rotated, substantially as specified.

4. The combination with the music-rolls, the shafts for rotating the rolls, means for actuating said shafts in both directions, of clutches connecting the shafts to the rolls, said clutches engaging and releasing automatically and carrying motion in opposite directions to their respective rolls and the action of both clutches being determined by the direction in which the shafts are rotated, substantially as specified.

5. The combination in a wind-motor of membranes H, air-passages $H^2$ and M for operating said membranes, a rotating valve opening and closing said passages, and a reversing-valve for determining which of said passages shall act, substantially as specified.

6. The combination in a wind-motor with the valve-shifting membranes, of rotating valve J, reversing-valve L, and air-passages $H^2$ and M, substantially as specified.

FREDERICK W. HEDGELAND.

Witnesses:
L. E. CURTIS,
EDW. S. EVARTS.